Jan. 3, 1950 C. J. CRANE 2,492,969
NIGHT AND ALL-WEATHER GROUND TRAINER
Filed July 3, 1946 4 Sheets-Sheet 1

INVENTOR.
CARL J. CRANE
BY
ATTORNEY
Charles L. Burgoyne
AGENT

Jan. 3, 1950   C. J. CRANE   2,492,969
NIGHT AND ALL-WEATHER GROUND TRAINER
Filed July 3, 1946   4 Sheets-Sheet 2
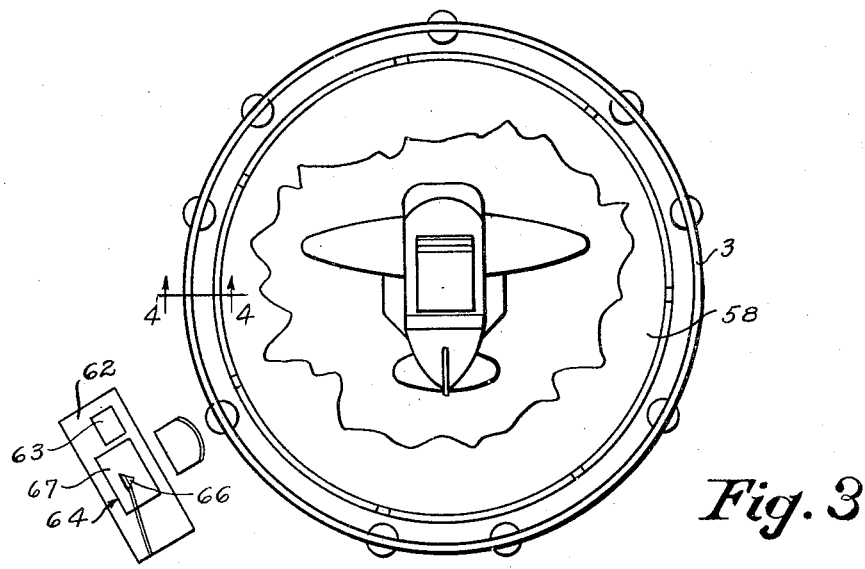
Fig. 3
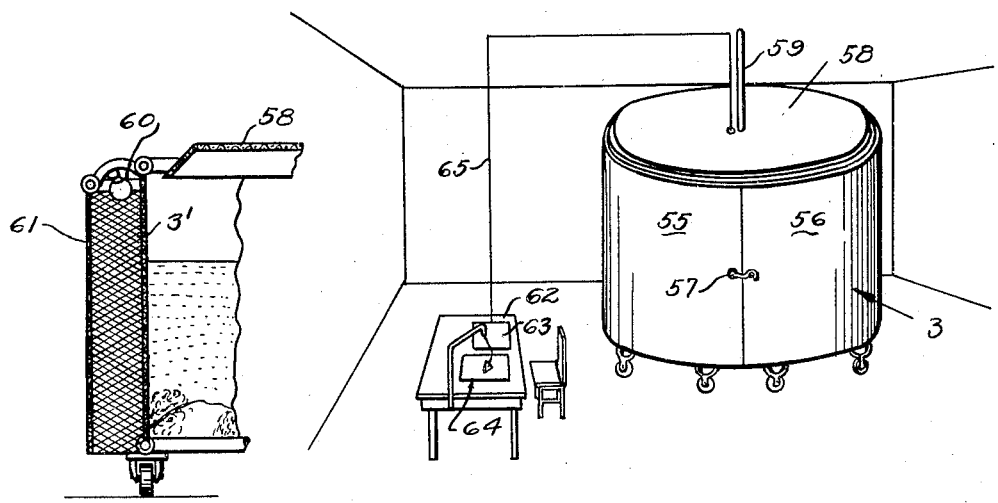
Fig. 4
Fig. 2
INVENTOR.
CARL J. CRANE
BY
ATTORNEY
Charles L. Burgoyne
AGENT

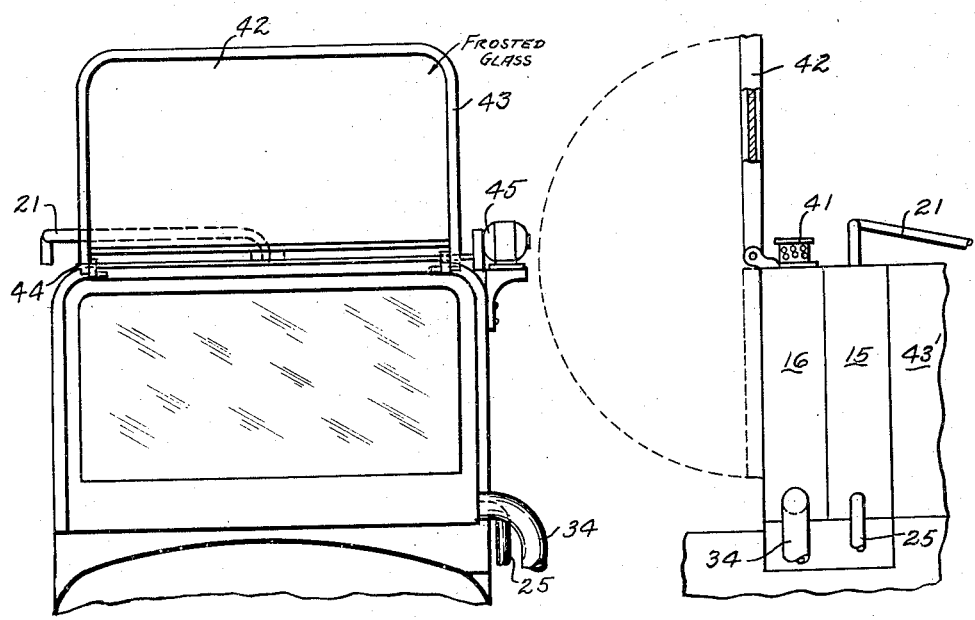
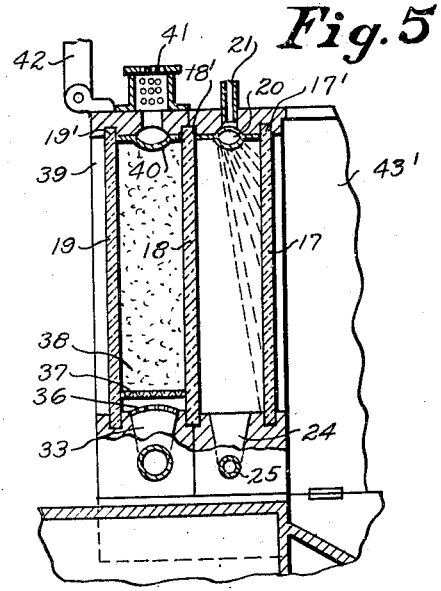
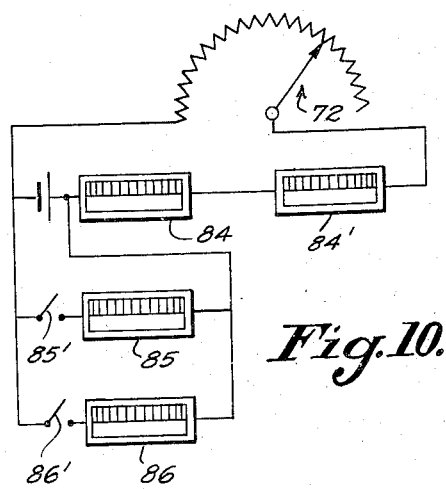

Jan. 3, 1950     C. J. CRANE     2,492,969
NIGHT AND ALL-WEATHER GROUND TRAINER
Filed July 3, 1946     4 Sheets-Sheet 4

INVENTOR.
CARL J. CRANE

Patented Jan. 3, 1950

2,492,969

UNITED STATES PATENT OFFICE 2,492,969

NIGHT AND ALL-WEATHER GROUND TRAINER

Carl J. Crane, Sacramento, Calif.

Application July 3, 1946, Serial No. 681,277

3 Claims. (Cl. 35—12)

(Granted under the act of March 3, 1883, as amended April 30, 1928; 370 O. G. 757)

The invention described herein may be manufactured and used by or for the Government for governmental purposes without payment to me of any royalty thereon.

The present invention relates to an aviation ground trainer for use in training aircraft personnel in instrument flying under conditions simulating those encountered in actual flight when weather and visibility condition are ideal, average or adverse.

The general purpose of the invention is to provide an aviation ground trainer comprising the combination of a flight trainer unit, a landscape or panorama background and a weather synthesizing shield preferably attached to the trainer unit in the line of sight between the trainee and the panorama background.

A related object is to provide an aviation ground trainer in which there is provided a landscape background which may be illuminated in various degrees ranging from complete darkness to broad daylight.

A further object of the invention is the provision in an aviation ground trainer of an all-weather hood or shield for association with the flight trainer unit, the latter resembling in general shape a small airplane and having a cockpit to accommodate the trainee.

Training devices for flight students have been proposed previously with the provision of landscape or panorama background, as for instance in the Edwards Patent No. 2,306,429 or in the Carmody Patent No. 2,331,303. In the present invention the landscape is in effect provided with superimposed and realistic weather hazards which present difficulties exactly similar to those encountered in actual flight. Thus a further object of the invention is to provide a ground trainer embodying means to condition a flight student to the difficulties of all-weather flying.

The above and other objects of the invention will become apparent upon reading the following detailed description and claims in conjunction with the drawings, in which:

Fig. 2 is a perspective view of the complete aviation ground trainer as seen by an observer in the same room with the trainer.

Fig. 3 is a top plan view of the complete aviation ground trainer, the cover or overcast screen being partly cut away to show the trainer unit.

Fig. 4 is a vertical cross sectional view taken on line 4—4 of Fig. 3, to show the construction of the landscape screen.

Fig. 5 is a side elevational view of the all-weather shield portion of the aviation trainer.

Fig. 6 is a vertical cross sectional view of the all-weather shield, the section being taken centrally of the shield.

Fig. 7 is an end elevational view of the all-weather shield.

Fig. 10 is a wiring diagram of the temperature simulation indicators.

Figure 1:
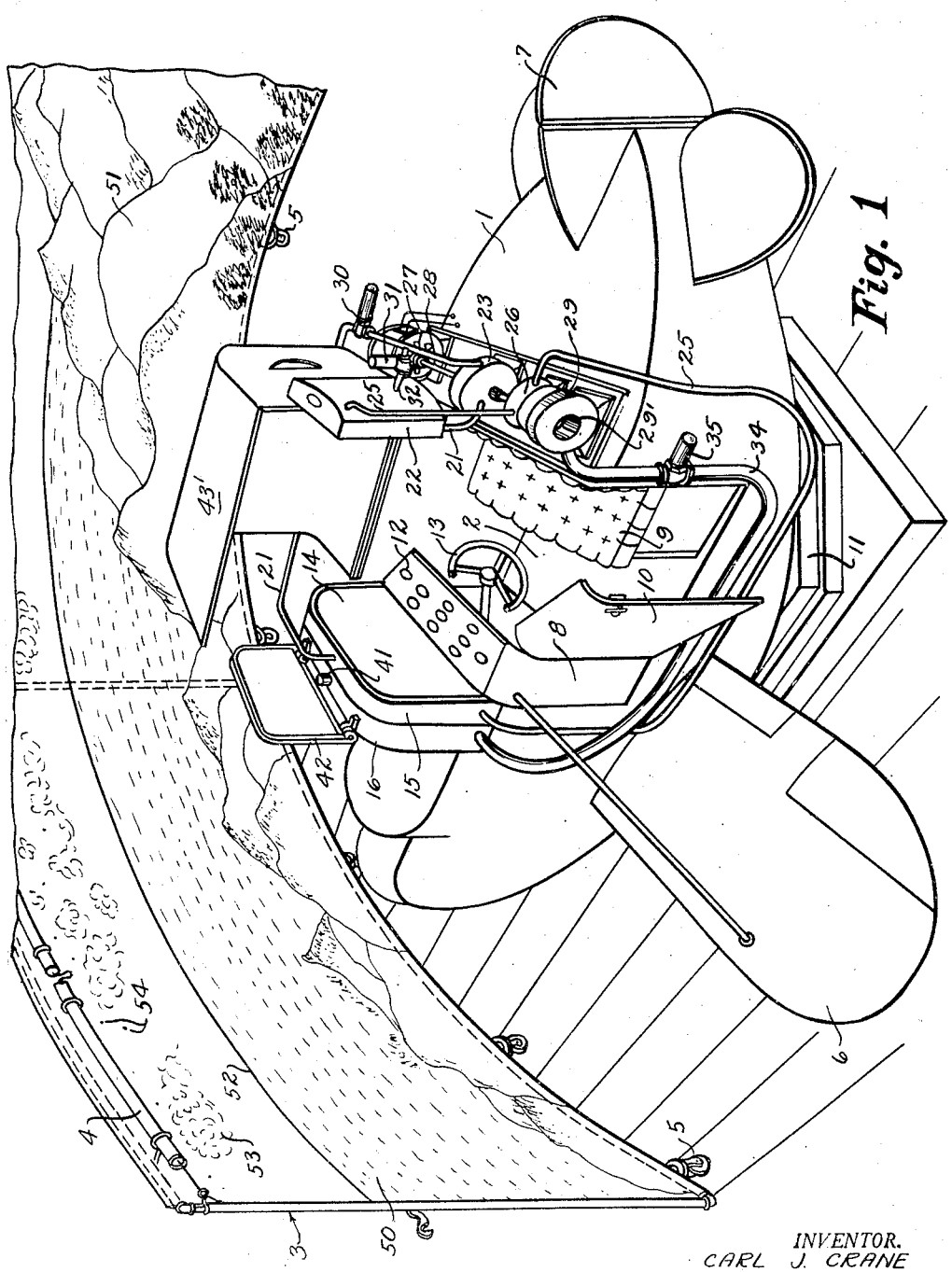
Fig. 1 is a perspective view of the aviation ground trainer, complete except for portions of the landscape screen and the instructor's desk.

Referring now to Fig. 1 the ground trainer unit I having a trainee cockpit 2 is shown in some detail and in its usual spaced relation with respect to the curved panorama screen 3, the latter being equipped with tubular lamps 4 along the upper edge and supporting casters 5 along the lower edge.

Trainer unit construction

The trainer unit I is built to resemble a small one-seated airplane including stub wings 6 and tail assembly 7. The fuselage 8 is provided with the cockpit 2, having seat 9 and side door 10. The fuselage is mounted on the octagonal base 11 for universal tilting movement and for rotation about a central point of a full 360° so that directional control of the trainer unit is possible, by appropriate movements of the rudder bar and control wheel by the trainee. These features are well-known in aviation ground trainers and reference may be had to various patents for the details thereof. For instance the Edwards Patent No. 2,306,429 or the Link Patents No. 1,825,462 and 2,099,857 describe fully the instrumentalities which may be relied on to effect the trainer unit control by manipulation of standard aircraft control elements installed in the trainer unit.

The trainer unit includes within the cockpit 2 an instrument board 12, control wheel 13 and also a rudder bar, not shown. On the instrument board are placed various flight indication instruments such as altimeter, air speed indicator, turn- and bank indicator, compass, rate-of-climb indicator, tachometer and also a clock. These instruments are arranged to operate in response to simulated flight conditions in accordance with the usual ground trainer construction. Mounted just forward of the instrument board is the all-weather shield 14 comprising two juxtaposed hollow sections 15 and 16, as shown in greater detail in Figs. 5, 6 and 7. The sections 15 and 16 are provided with separate frames encircling the spaced glass panels 17, 18 and 19, which are cemented or otherwise made fluid-tight within the grooves 17', 18" and 19'. The double frame structure may be held together by means of bolts passing through one frame and threaded into the other; or by any other obvious expedient. The hollow section 15 is primarily a rain simulating element, and the section 16 is a snow simulating element.

Mounted within the section 15 at the top thereof is a spray head 20 having fine apertures angled toward the glass panel 17, to give the effect of a forward velocity of the trainer unit into the streams of water from the spray head. Connected with the spray head there is a water pipe 21 fed from a water reservoir 22 and a pump 23. The water flows down through section 15 and collects at the bottom in a sump 24, from which it is returned to the reservoir by means of pipe 25 and scavenging pump 26.

The pumps 23 and 26 are directly connected to a motor 27, the common shaft 28 being further connected to a blower 29. Thus the motor and the three driven units operate together but the medium, such as water and air, which is pumped may be controlled by appropriate valves. Accordingly a solenoid actuated valve 30 is installed in pipe 21 to close or open the line at the will of the trainer instructor. When the valve 30 is closed another solenoid valve 31 is simultaneously opened to permit the water being pumped into line 21 to be short circuited back to the reservoir 22 through pipe 32, thus avoiding any unnecessary loading of the water pump 23 and the motor 27.

The shield section 16, used to simulate snowfall, has an inlet chamber 33 connected by a large diameter pipe 34 to the blower 29 having the usual suction inlet 29' centrally thereof. The air pipe 34 carries a solenoid valve 35, which like valves 30 and 31 is under control of the instructor. The air blown through pipe 34 and into the chamber 33 is forced up through a curved screen 36, thence through a fine mesh screen 37 and then acts to agitate the imitation snow 38. This snowflake material of white diffuse particles may be in the nature of chalk dust or other light powder but preferably takes the form of small particles of thin white paper, which are light enough in weight to float freely in the turbulent air within the section 16. At the upper wall of the section 16 there is an air outlet 39 covered by a fine screen 40 on the inside and by a vented cap 41 on the outside. The snowflake material may be agitated for long periods of time but will not be lost from the section 16 because of the screens installed at the air inlet and outlet. The flow of air may be stopped and started as the instructor may desire, through actuation of the solenoid valve 35. The volume of air reaching the section 16 and also the volume of water pumped to section 15 may be regulated by regulating the speed of the drive motor 27. By this means the intensity of the simulated snowstorm or rainstorm in the all-weather shield 14 may be varied by the instructor.

The upper front edge of the section 16 is equipped with a hingedly mounted translucent screen 42, which is merely a plate of frosted or etched glass enclosed in a mounting frame 43 provided with a pair of lugs apertured to receive a mounting shaft 44. The shaft is rotatably mounted in lugs carried at the top edge of the section 16 of the all weather shield 14, and has a driving connection with respect to the lugs on mounting frame 43. The shaft 44 is coupled to a geared motor 45, as shown in Fig. 5, thus allowing the screen 42 to be raised and lowered by actuation of the motor control located at the instructor's desk. The screen 42 when lowered reduces visibility of the panorama in simulation of fog or clouds as encountered in actual flight. The screen-operating motor 45 is of the reversible type to allow the screen 42 to be moved by remote control in either direction.

To complete the trainer unit there is provided a hinged cover or canopy 43' having a shape generally corresponding to that of the all-weather shield 14, and being adapted to abut the rear edge of section 15 when closed down (see Figs. 6 and 7). Thus in practice the trainee sees the panorama only through the all-weather shield 14.

Panorama screen construction

The forward range of vision of the student occupying the trainer is limited to the panorama as seen through the shield 14 and in order that the scenery may vary a circular background screen or wall 3 is provided and is movably mounted on casters 5. The variations as depicted on the screen permit a change in the character of the landscape to correspond with the selected course and also to correspond with weather hazards selected by the instructor. In simulated flight the trainee may expect the desert scenery as at 50 to give clear weather but as the trainer unit or the screen is turned, the trainee may notice the mountains as at 51. At this time the weather may reasonably be expected to change to light rain, fog, or even snow. The instructor accordingly is able to provide weather conditions consistent with the type of scenery directly ahead of the trainer unit. The screen 3 also has a horizon 52 and in the upper or sky portion the screen may have clouds 53 shown thereon. Scattered over the sky there may be star images 54 which are preferably in the form of Lucite rivets having their enlarged heads at the back of the screen 3, and being adapted to collect light behind the screen and carry it through the screen to be seen by the trainee located in the trainer unit.

The screen 3 is preferably made of two semicylindrical sections 55 and 56 which may be latched together as at 57 to form a complete cylinder (see Fig. 2), which on the inside surface is painted or otherwise decorated to form a complete and diversified panorama. Each section 55 or 56 is built up of pipe sections to form a supporting frame for the screen secured thereon in any suitable manner. Along the upper edge of the screen the tubular lamps 4 will illuminate the screen and by the use of rheostats controlled by the instructor the intensity of the lighting may be varied, or may be turned off completely. The circuits to these separate lamps may also be closed by spring retracted push buttons to give brief and instantaneous lighting of the screen for simulation of lightning. To prevent the influx of room lighting to the screen and trainer unit the cylinder comprising sections 55 and 56 is provided with a cover or ceiling 58, which is broken away in Fig. 3 to show the trainer unit therebelow. The ceiling member 58 is carried on a rod 59 fixed to the ceiling of the instruction room.

A modified screen construction is shown in Fig. 4 wherein the screen 3' is in the form of a translucent cellulosic film permitting light to pass therethrough. The film is provided with scenery which will permit the passage of light from the lamps 60 mounted at appropriate intervals around the screen. The decorated film should resemble in light-passing qualities the well-known Kodachrome slides used in color photography. In order to confine the light from the lamps 60, there is also provided an opaque curtain 61 suspended from a circular support. The translucent type of panorama or screen 3' will give the same results as the opaque screen 3, except that the scenery is viewed by light passing directly therethrough instead of by reflected light, as in the form first described.

*Instructor's control desk*

The controls for the night and all-weather trainer are mounted on a desk 62 (see Figs. 2 and 3). Mounted on the desk top there is a control panel 63 and a flight recorder or indicator 64. The panel and recorder have electrical connections with the trainer unit by means of a multiple conductor 65, all the various connections being made below the top of the table. The flight recorder is of a standard type such as described in the Link Patent No. 2,179,663 or in the Sorensen Patent No. 2,332,475, and comprises chiefly a map 67 traversed by a motor-driven recorder carriage or "bug" 66, the latter being remotely controlled by operation of the trainer unit. By this means the instructor may follow the course selected by the student and compare it with the course stated in the student's flight problem.

Figure 8:
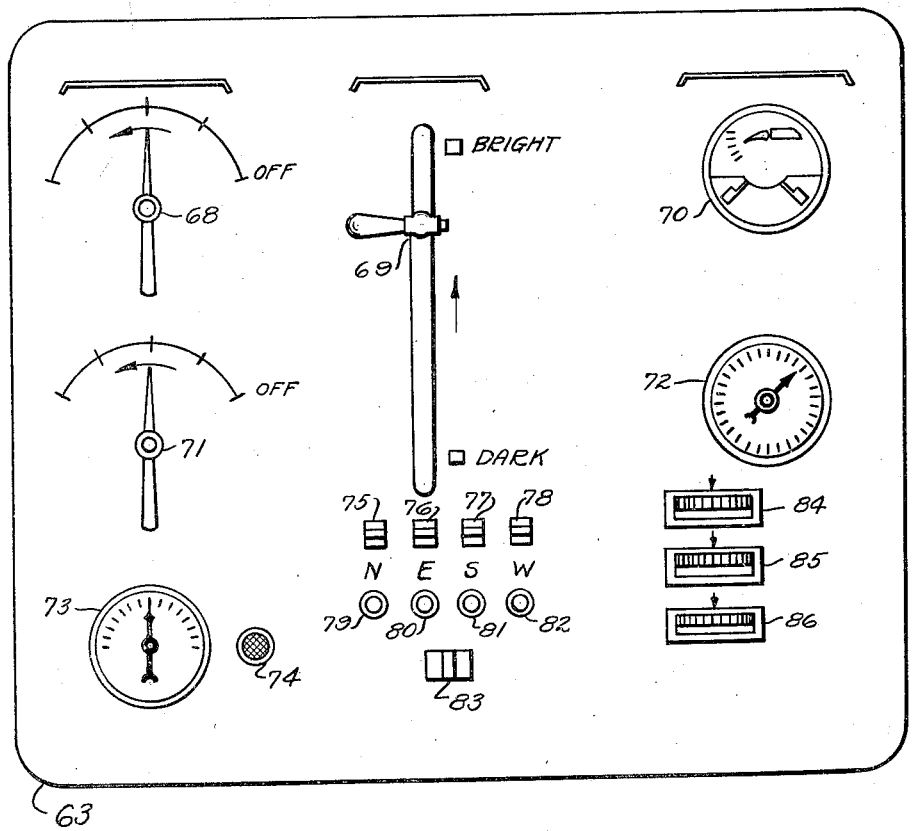
Fig. 8 is a plan view of the instructor's control panel.

The instructor's control panel 63 is shown in some detail in Fig. 8 and carries the various controls for the trainer and for the simulated weather and visibility effects, as described above. The control panel may carry all the usual controls present in any trainer control system, but for the purpose of the present disclosure only a limited number of controls and indicators will be described. Starting at the top left corner and moving to the right there will be seen first the rain control 68, then the illumination rheostat 69, the wing flap and landing gear indicator 70, the snow control 71, the temperature regulator 72, the fuel gauge 73, the fuel warning lamp 74, the snap switches 75 to 78, push button switches 79 to 82, line switch 83 and temperature indicators 84, 85 and 86.

The rain control 68 is in fact a speed controller for the motor 27 which drives the water pump 23. As soon as the control 68 is moved from "off" position it also closes a circuit to open solenoid valve 30 and close solenoid valve 31. Thus the water from reservoir 22 is circulated in the water pipe 21 toward the spray head 20. Turning the control 68 to the first mark will merely produce a thin rain or drizzle in the weather shield compartment or section 15, and further turning of the control in the direction of the arrow will increase the speed of motor 27 and produce heavier precipitation. In a similar manner the snow control 71 may be used to start and regulate the motor 27, being also arranged to open the solenoid valve 35 in airpipe 34 at the same time the motor is started. Turning the control 71 in the direction of the arrow gradually increases motor speed to increase the intensity of the snow turbulence in the weather shield section 16.

Considering now the temperature regulator 72 and the temperature indicators 84, 85 and 86, it is pointed out that temperature of the air should normally vary according to the kind of weather encountered. To simulate temperature changes the regulator 72 is provided in the form of a rheostat carrying a small current and connected to a meter 84 calibrated to read in degrees of temperature. In the same circuit is also a meter 84' located in the trainer to indicate to the student the changes in free air temperature (see Fig. 10). These changes are coordinated with the type of weather simulated in the all-weather shield 14, the coordination being accomplished by the instructor. When low temperatures are noted by the student he should respond by turning on the wing de-icer and the airspeed pitot tube heater, if the low temperatures are accompanied by rain. When the student responds by turning on these devices by means of switches 85' and 86', the response will be indicated in the simulated temperature indicators 85 and 86 on the panel 63. While the simulation of temperature changes by the use of appropriate electrical circuits involves very little apparatus it is also possible to actually control the temperature in the instruction room by a suitable regulator under control of the instructor, the regulator being connected to air conditioning units installed in or adjacent to the instruction room.

Figure 9:
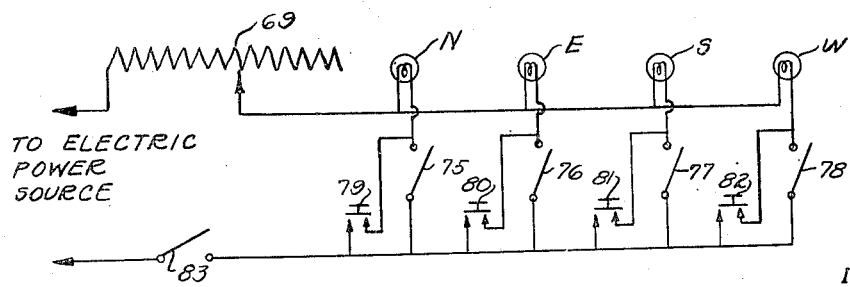
Fig. 9 is a wiring diagram of the panorama lamps and switches.

The control of illumination on the mural screen 3 is accomplished by rheostat 69 and the various switches therebelow. The circuit for these controls is shown in Fig. 9. The illumination of the screen is provided in four sections each taking in a 90 degree arc and each section being under control of separate switches. The four illumination sections are indicated by the lamps N, E, S and W in Fig. 9 and the switches for controlling these sections are also similarly marked on the control panel 63 for the guidance of the instructor in selecting a proper combination of lighting elements. As seen in Fig. 9 the lights are turned on by first throwing the line switch 83 and then throwing the separate snap switches 75 to 78. The relative intensity of the lighting is regulated by use of the rheostat 69. In certain circumstances according to time of day or weather conditions certain sections of lighting may be turned off, but with the four section arrangement corresponding to the four cardinal directions almost any set of circumstances can be simulated. Also any section which is turned off at the snap switch may be suddenly turned on or off by use of push button switches 79 to 82, for simulation of lightning. For instance if the trainer is headed northeast, the lighting sections N and E may be turned on with only medium intensity and the sections S and W may be turned off. Then as an accompaniment to rain in the shield 14 the lighting sections S and W may be blinked on and off by the push button switches 81 and 82, thus simulating lightning along with rain. If desired the lighting sections N, E, S and W and the push button switches 79 to 82 may form a separate circuit apart from the rheostat 69 and snap switches 75 to 78, so that actuation of the push buttons will always produce maximum light intensity of the various sections when the lightning effects are wanted. This hook-up will allow a more flexible and accurate control of lighting, where partial illumination is to be combined with lightning phenomena.

The control panel 63 also carries a wing flap and landing gear position indicator 70, a simulated fuel gauge 73 and a fuel depletion signal lamp 74. These devices do not form part of the present invention but are merely identified on the panel 63 to make the description more complete.

In operation of the all-weather shield 14 the rain simulating section or compartment 15 may be relied on for the simulation of fog, provided the water circulated in the system is maintained at a temperature somewhat greater than room temperature to produce a condition of supersaturation of the air within the compartment 15.

This fog effect is also promoted by the use of a very fine spray issuing from the spray head 20. When the rain compartment 15 is used to simulate fog it may be in operation at the same time the snow simulating compartment 16 is operated, since snow and fog can occur at the same time in actual weather conditions which are favorable to this combination, such as cold upper air strata and warmer lower air strata. In using the section 15 to simulate fog the control 68 need not be turned beyond the first dial marker. Similarly if the snow section 16 is simultaneously operated the control 71 should not be turned beyond the first dial marker since both controls are connected to the same motor 27.

From the above description of the night and all-weather trainer it will be apparent how the trainer controls should be manipulated, but the degree of realism in weather and visibility effects must to a certain extent depend on the skill and foresight of the instructor. The problem presented to the student should be subject to great variation, just as actual flying conditions vary from day to day and from place to place. It should be understood that the trainer having a suitable panorama screen in surrounding relation may not necessarily carry a weather simulating shield, since the screen and lighting effects are useful and effective apart from the simulation of rain and snow. Also the invention is not of necessity limited to use with a screen completely surrounding the trainer, nor is there any limit to the variety of scenery that may be depicted on the screen. The scenery may be changed from time to time according to the type of training desired.

The embodiments of the invention herein shown and described are to be regarded as illustrative only, and it is to be understood that the invention is susceptible to variations, modifications and changes within the scope of the appended claims.

I claim:

1. An aviation ground trainer comprising a trainer unit having a student's cockpit, means mounting said trainer unit for rotation about a vertical axis and for tilting movements to simulate the movements of an aircraft in actual flight, an enclosure of cylindrical form having curved side walls and a circular top wall with said trainer unit situated within said enclosure and spaced from said walls, means on said side walls depicting a continuous panorama to simulate scenery encountered in actual flight of an aircraft, means distributed around the interior of said enclosure to illuminate said panorama, a weather simulating shield mounted on said trainer unit near the forward end thereof and above said cockpit, said shield comprising spaced parallel sheets of transparent material having their edges seated in a surrounding frame, the spaces between said parallel sheets providing weather simulating compartments in the forward line of sight of the student located in said cockpit, and means for simulating rain in one of said compartments including a spray head adapted to spray thin streams of water downwardly within said one compartment.

2. An aviation ground trainer comprising a trainer unit having a student's cockpit, means mounting said trainer unit for rotation about a vertical axis and for tilting movements to simulate the movements of an aircraft in actual flight, an enclosure of cylindrical form having curved side walls and a circular top wall with said trainer unit situated within said enclosure and spaced from said walls, means on said side walls depicting a continuous panorama to simulate scenery encountered in actual flight of an aircraft, means distributed around the interior of said enclosure to illuminate said panorama, a weather simulating shield mounted on said trainer unit near the forward end thereof and above said cockpit, said shield comprising spaced parallel sheets of transparent material having their edges seated in a surrounding frame, the spaces between said parallel sheets providing weather simulating compartments in the forward line of sight of the student located in said cockpit, means for simulating rain in one of said compartments including a spray head adapted to spray thin streams of water downwardly within said one compartment, and said rain simulating compartment being adapted to simulate fog by the use of water at such temperature as to produce supersaturation of the air contained within said rain simulating compartment.

3. An aviation ground trainer comprising a trainer unit having a student's cockpit, means mounting said trainer unit for rotation about a vertical axis and for tilting movements to simulate the movements of an aircraft in actual flight, an enclosure of cylindrical form having curved side walls and a circular top wall with said trainer unit situated within said enclosure and spaced from said walls, means on said side walls depicting a continuous panorama to simulate scenery encountered in actual flight of an aircraft, means distributed around the interior of said enclosure to illuminate said panorama, a weather simulating shield mounted on said trainer unit near the forward end thereof and above said cockpit, said shield comprising spaced parallel sheets of transparent material having their edges seated in a surrounding frame, the spaces between said parallel sheets providing weather simulating compartments in the forward line of sight of the student located in said cockpit, means for simulating snowfall in one of said compartments including a screen along the lower side of said one compartment, an air inlet chamber below said screen to receive a continuous supply of air adapted to pass upwardly through said screen and agitate a quantity of white diffuse particles contained in said one compartment, and an air vent at the upper side of said one compartment to permit the escape of said continuous supply of air.

CARL J. CRANE.

REFERENCES CITED

The following references are of record in the file of this patent:

UNITED STATES PATENTS

| Number | Name | Date |
|---|---|---|
| 635,043 | Grismer | Oct. 17, 1899 |
| 1,281,720 | Tully | Oct. 15, 1918 |
| 2,105,008 | Riley | Jan. 11, 1938 |
| 2,306,429 | Edwards | Dec. 29, 1942 |
| 2,331,303 | Carmody | Oct. 12, 1943 |
| 2,392,781 | Simjian | Jan. 8, 1946 |
| 2,409,938 | Hutter | Oct. 22, 1946 |